Aug. 26, 1958     S. H. NORTON     2,848,985
VALVE ROTATING DEVICE
Filed Feb. 20, 1956                             3 Sheets-Sheet 1
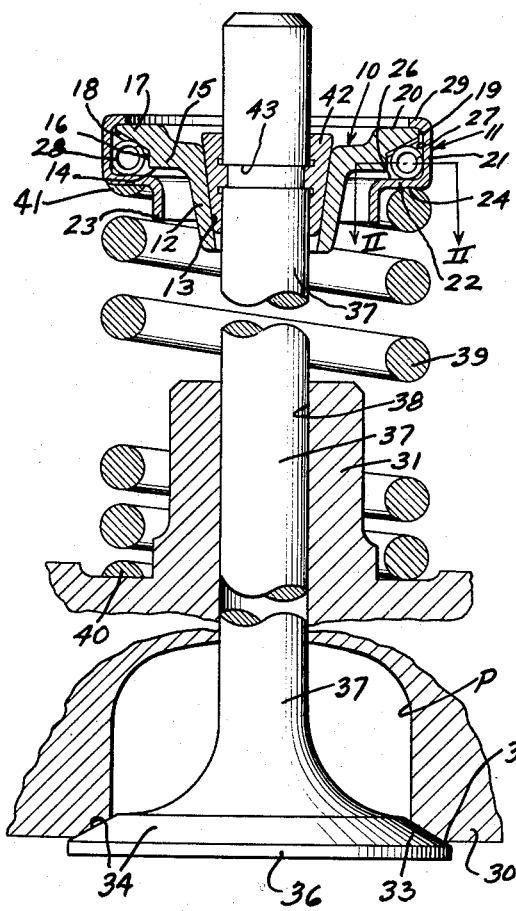
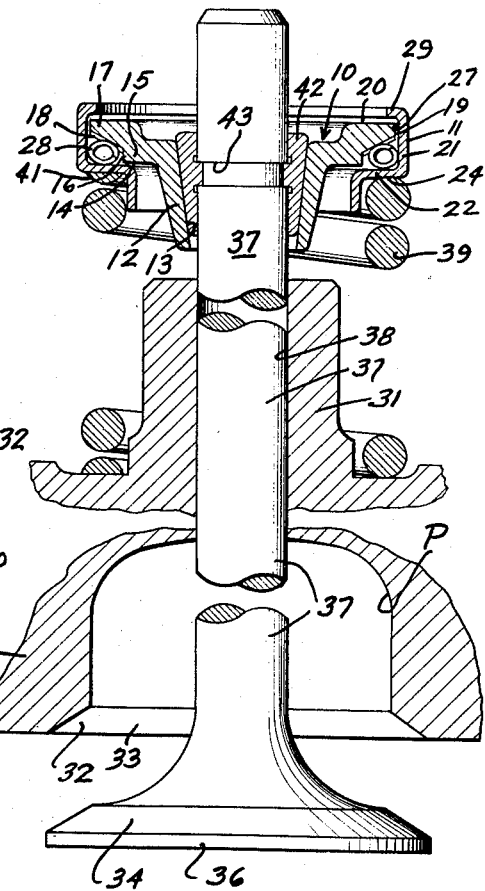
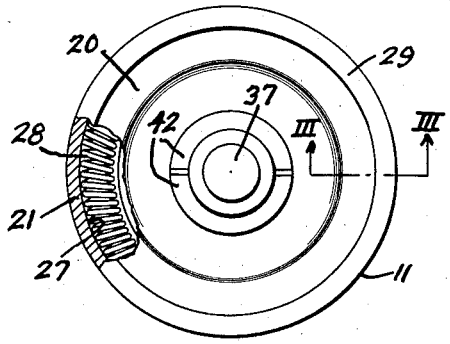
Inventor
SAMUEL H. NORTON

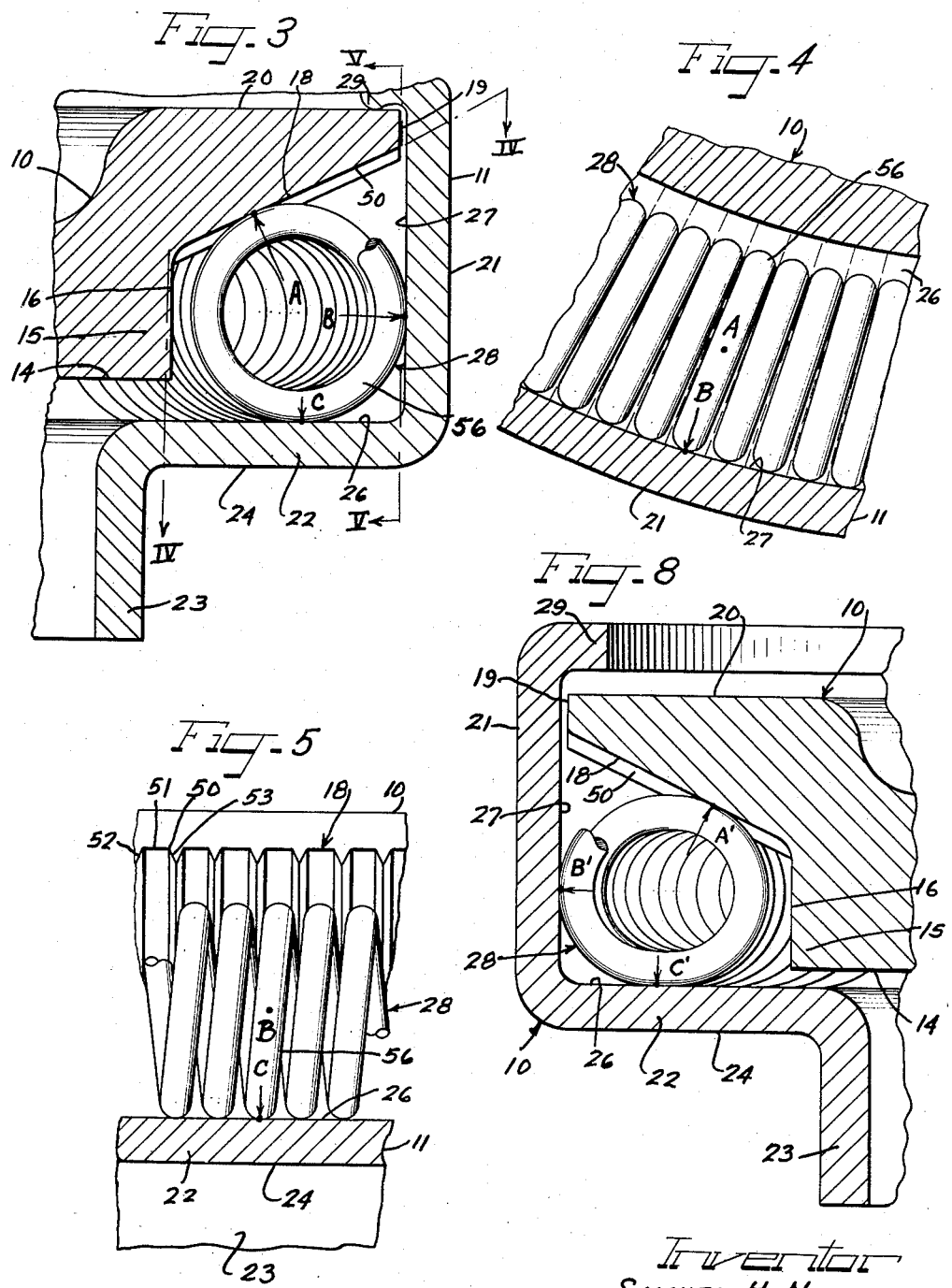

Aug. 26, 1958  S. H. NORTON  2,848,985
VALVE ROTATING DEVICE
Filed Feb. 20, 1956  3 Sheets-Sheet 3

Inventor
SAMUEL H. NORTON
by Hill, Sherman, Meroni, Gross & Simpson
Attys.

United States Patent Office 2,848,985
Patented Aug. 26, 1958

2,848,985

VALVE ROTATING DEVICE

Samuel Harry Norton, University Heights, Ohio, assignor to Thompson Products, Inc., Cleveland, Ohio, a corporation of Ohio Application February 20, 1956, Serial No. 566,509

24 Claims. (Cl. 123—90)

The present disclosure is a continuation-in-part of that contained in my pending application, Serial No. 447,784, filed August 4, 1954, now Patent No. 2,758,583.

This invention relates generally to a device for rotating two axially adjacent parts in response to varying axial loads and more particularly relates to a valve-rotating device wherein two separated axially loaded relatively rotatable parts of a poppet valve assembly are interconnected by spring means including helically wound coiled loops or coils arranged to transmit axial loads between the separated parts across the transverse axis of the loops, the parts and the spring means being arranged to be restricted against rotation at minimum load but operating under increased load to effect a tipping or tilting of the loops or coils for rotatable driving movement between the parts.

Although the principles of the present invention are of general utility, a particularly useful application is found in connection with the provision of valve-rotating devices on the valves of internal combustion engines. It is highly desirable to provide means for rotating engine valves since cyclic operation and rotation of the valves during the course of engine running assists in eliminating valve burning as well as wearing, pitting and stem-galling and scoring.

It is an object of the present invention to provide a method and means for rotating an engine valve which is made of a reduced number of simplified parts and which can be manufactured and fabricated at great economy.

Another object of the present invention is to provide a rotating device for valves which will not turn as the valve is being raised off its seat or when it is being lowered onto its seat, thereby eliminating excessive valve and valve seat wear.

Yet another object of the present invention is to provide a valve-rotating device utilizing coiled loops or spring coils which will function between axially adjacent relatively rotatable parts in a manner similar to the action of an overrunning clutch.

Another object of the present invention is to provide improvements in a valve-rotating device of the type utilizing tiltable spring coils transmitting axial loads transversely of the spring coiling axis.

Many other advantages and additional objects of the present invention will become manifest to those versed in the art upon making reference to the detailed description which follows and the accompanying sheets of drawings in which preferred structural embodiments incorporating the principles of the present invention are shown by way of illustrative example. It is believed that the methods of the present invention will be most clearly understood from a description and an understanding of the apparatus provided for practicing the steps of the methods disclosed herein.

On the drawings:

Figures 1 and 11 are fragmentary views showing a valve-rotating device according to the principles of the present invention applied to the poppet valve assembly of an internal combustion engine and with parts broken away and with parts shown in cross-section to illustrate the positioning of the components when the valve is raised during the cyclic operation thereof, Figure 1 showing the valve-rotating device at the start of a typical valve-rotating cycle and Figure 11 showing the components of the valve-rotating device at the end of a valve-rotating period;

Figure 2 is a plan view of the valve-rotating device with a broken portion taken substantially on line II—II of Figure 1 to show the tilt of the spring coils or loops;

Figure 3 is an enlarged cross-sectional view, fragmentary in part, and taken generally on line III—III of Figure 2;

Figure 4 is a fragmentary cross-sectional view with parts shown in elevation taken through the valve-rotating device on the line IV—IV of Figure 3 before the coils or loops are tipped due to increased axial loads;

Figure 5 is a side elevational view taken substantially on line V—V of Figure 3 showing the coils or loops in the same condition as described in connection with Figure 4;

Figure 8 is a cross-sectional view generally similar to Figure 3, but on the opposite side of the valve-rotating device, showing the positioning of the parts when the valve is open and the valve spring compressed.

As shown on the drawings:

Figure 6:
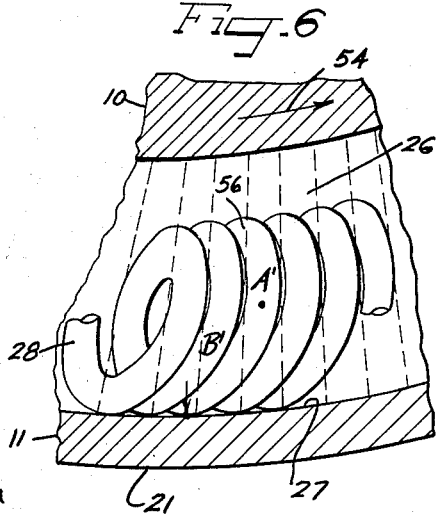
Figure 6 is a view similar to Figure 4 but showing the coils or loops after they have been tipped over by an increased axial load transmitted between the axially adjacent parts.

Axially adjacent relatively rotatable parts are provided respectively by a valve cap indicated at 10 and a collar member indicated at 11. The valve cap 10 has a generally cylindrical body portion 12 which is axially tapered to provide a bore 13 through which the end of a valve stem is passed. Near the top of the valve cap 10 is provided an annular shoulder 15 having an annular radially extending wall 14 and an annular axially extending wall 16. Extending radially outwardly from the annular shoulder 15 is a flange 17 shaped or formed to provide a tapered end wall forming an annular conically-shaped bearing surface, the end wall or bearing surface being indicated at 18. The end wall or bearing surface 18 terminates in an axially extending outer peripheral edge 19. The valve cap 10 has a top surface indicated at 20.

The collar member 11 includes a generally cylindrical body portion 21 which, in effect, forms a concave side wall concentrically outwardly of the common axis on which the axially adjacent parts are disposed and concentrically outwardly of the end wall or bearing surface 18. The collar member 11 is flanged to provide a flat end wall 22 offset at right angles to the side wall 21. The end wall 22 is flanged as at 23, thereby forming a pilot portion which extends axially with respect to the parts and which is spaced concentrically outwardly of the body portion 12 of the valve cap 10.

One face of the flange 22 provides a valve spring seating surface 24, while the inside flat inner surface of the flange 22 is indicated at 26. The flat inner surface 26 is axially spaced from the bearing surface 18 and lies adjacent a concave inner surface indicated at 27 provided by the side wall 21.

Interposed between the parts herein illustrated as constituting the valve cap 10 and the collar member 11, are spring means providing a plurality of helically coiled loops or spring coils. It will be noted that the bearing surface 18, together with the flat inner surface 26 and the concave surface 27 together form an annular space or recess means. Thus, the spring means are conveniently located in such space and in the present form of the invention constitutes a coiled spring 28 formed into a generally annular loop with the opposite ends either abutting or spaced in near abutting relation.

When the three parts of the valve-rotating device of the present invention are assembled, namely, the valve cap 10, the collar 11 and the spring means 28, the cap 10 is placed over the spring means 28 and is pressed down until all of the coils are subjected to a pressure approximately equal in amount to a contemplated minimum axial load, for example, normal valve spring pressure. At the same time, the valve cap 10 is turned to the left for a left-hand loop spring and to the right for a right-hand loop spring until the coils of the spring means 28 collapse or tip over. The pressure is then relieved until it is slightly greater in amount than minimum contemplated axial load, whereupon the rim of the collar 21 indicated at 29 is axially offset by spinning or crimping over the top surface 20 of the valve cap 10 until the valve cap 10 cannot be raised by the strength of the spring means 28. Thus, the valve cap 10, the collar 11 and the spring coils of the spring means 28 are assembled together in preloaded condition. With the parts thus arranged, it will be understood that the spring means 28 operates to transmit normal spring loads between the collar 11 and the valve cap 10. It is further contemplated, however, in accordance with the principles of the present invention, that the spring means 28 will not only function to transmit normal spring loads between the collar 11 and the valve cap 10 and will normally restrict the parts against relative rotation, but the coils or coiled loops of the spring means 28 are effectively utilized as a means for providing shiftable elements between the relatively rotatable parts 10 and 11. Thus, the spring means 28 can conveniently comprise any selected plurality of helically looped coils or a helically wound coil spring having a multiplicity of individual coils closely spaced with respect to one another so that the helix angle of the individual coils is sufficiently small to permit the spring means 28 to transmit forces in a direction transverse to the longitudinal axis of the spring.

As shown on the drawings, the valve-rotating device of the present invention may be assembled with a poppet valve assembly as may be employed in an internal combustion engine or the like.

In the embodiment shown, an engine part is indicated at 30 which provides a port indicated at P having a valve-opening 32 presenting a beveled valve seat 33 regulated by the beveled seating surface 34 of a valve head 36 carried on the end of a valve stem 37. The stem is slidably carried in an engine part 31 by means of a valve stem guide 38. A valve spring 39 has one end 40 bottomed against the engine part 31 and in the form of the invention described in connection with Figures 1 and 11, the opposite end indicated at 41 is bottomed against the valve spring seating surface 24 on the flange 22 of the collar 11.

The valve cap 10 is locked adjacent the end of the valve stem 37 by means of a valve stem locking member 42 cooperable with an annular locking groove 43 formed adjacent the end of the stem 37.

As is more clearly indicated in Figures 3, 5, 7 and 8, the tapered end wall or bearing surface 18 is particularly characterized by the formation therein of a plurality of circumferentially spaced grooves 50. Each groove 50 has a bottom 51 and tapered side walls 52 and 53. The grooves preferably correspond in number to the number of spring coils or coiled loops provided by the spring means 28, however, a slight variation can be tolerated in the number of spring coils. Thus, when the parts are assembled, pressure is applied to the valve cap 10 positioned over the spring means 28. The spring coils or coiled loops of the spring means 28 are then forced into partial or complete register with the corresponding slots or grooves 50 formed in the end wall or bearing surface 18. When thus assembled, the grooves 50 function to keep the coils of the spring means 28 separated and properly spaced at all times. Free action of the coils is insured by providing ample clearance. In other words, the grooves 50 are of sufficient width to give free tipping movement to the coils 56. The tapered side walls 52 and 53 operate to space the individual coils from one another and prevent the coils from bunching during the cyclic operation of the device.

The circular shelf provided by the abutment surface 14 on the annular shoulder 15 is in registry with the inner portion of the flat inner surface 26 formed on the flange 22. Accordingly, the surfaces 14 and 26 cooperate to provide an axial stop limiting the relative axial movement of the parts 10 and 11 and restricting the amount the spring coils of the spring means 28 can be compressed or tilted or bent over. By selecting the spacing dimension between the surfaces 14 and 26, it will be appreciated that the device is constructed to make overstressing of the spring coils impossible.

The spring means 39 may be considered as having four different pressures or compressed lengths, (1) the free length, (2) the valve-closed length, (3) a length slightly less than the valve-closed length, (4) and the valve-open length.

As will be noted upon referring to Figure 3, an individual coil is indicated at 56 and contacts the valve cap at point A. The coil contacts the concave inner surface 27 of the collar 11 at point B and the flat inner surface 26 at point C. The angle of taper of the end wall or bearing surface 18 is approximately 25°, however, it will be appreciated that this angle can be varied through a reasonable range, for example, in the order of 20 to 30°. With such an arrangement, the pressure of the spring means 28 against the collar 11 will be greater at the point C on each individual coil 56 than at the point B because of the wedging action of the grooved conical bearing surface 18 of the valve cap 10. Thus, as the valve cap 10 is turned relative to the collar 11 under pressure as during the assembly operation and the coils 56 of the spring means 28 tip over, each point A will travel approximately twice as far as the point B, while such portions of the spring as are indicated by the point C will remain stationary. Thus, as shown in Figures 4 and 5 and in Figures 6 and 7, the individual coils 56 of the spring means 28 are being pressed tightly against the collar 11 at point B and as the coils 56 can pivot at A' and C', the friction at B' will tend to hold each coil 56 back at the point B' causing the coils to not only tip forward at A' but to tip backward at B'. Therefore, looking down on the coils 56 as in Figure 6, or sideways at the coils as in Figure 7, it will be noted that the coils 56 have been tipped forward at A' and held back at B'. This places the coils of the spring means 28 at an angle to the inner concave face or surface 27 of the collar 11. As they are wedged against this concave face 27, by virtue of the inclined angle of the end wall or bearing surface 18 on the valve cap 10 and the flat inner face or surface 26 of the collar 11, the coils 56 will act like the dogs in an overrunning clutch and will resist being moved on the collar 11 in a direction opposite to that which the valve cap 10 has turned, which direction of turning is indicated by the arrow 54 in Figure 6 and Figure 7. This angular position of the coils 56 is also shown in the fragmentary section of Figure 2.

Figure 7:
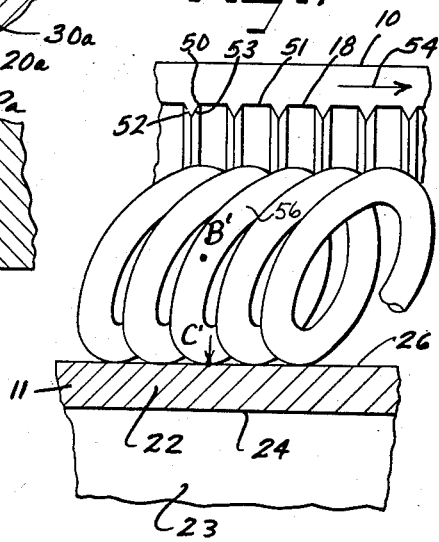
Figure 7 is a view similar to Figure 5 but showing the coils or loops in the condition of Figure 6.

At the valve-closed position of Figure 1, the coil spring 39 is retracted and its pressure is much less than at the valve-open position of Figure 11. Thus, the spring means 28 will have its individual coils 56 in the position shown in Figure 4 and in Figure 5, slightly tipped over at the top as in Figure 5 and also slightly tipped to the inner concave wall or surface 27 of the collar 11, as at point B in Figure 4. As the valve spring 39 is compressed during the valve-opening movement, greater and greater load is placed on the coils or loops 56 of the spring means 28 until the coils 56 tip forward as at A', as shown in Figure 6, and are held back at B', as shown in Figure 7 due to the friction against the inner concave wall or surface 27 of the collar 11. When the coils 56 tip over at A' and pivot at C', it will be apparent that the valve cap 10 will turn. In order to utilize this turning movement as a net effective angular displacement, it is necessary that the parts be physically shifted rather than merely oscillated. In accordance with the principles of the present invention, this is accomplished by the overrunning clutch action of the coils 56 at B'.

Thus, when the pressure of the valve spring 39 decreases during the valve-closing movement, the coils 56 of the spring means 28 will straighten up, raising the valve cap 10 back to its original position. It will be appreciated, therefore, that if the coils 56 of the spring means 28 are to regain their original position after straightening up, it is necessary that the coils 56 slide back at B' the same amount that sliding occurred at this point when the coils 56 were being forced over into a tipped position.

As described hereinabove, the coils 56 are at an angle to the inner concave face 27 of the collar 11 at the point B'. The coils 56 are also wedged between the flat inner surface 26 of the collar 11 and the grooved tapered surface 18 of the valve cap 10. The slight angularity of the coils 56 to the collar 11 at B' will cause the coils 56 to bite against the inner concave surface 27 of the collar 11 at B'. The point B' is a greater distance from the center of valve rotation than the point C'. Therefore, the torque moment exerted at the point B' is greater than at the point C'. It will be further noted that the forward tipping of the coils 56 is a circumferential direction at A' will place the coils 56 at a non-gripping angle to the flat inner face or surface 26 of the collar 11 at the point C'. As the coils 56 straighten up due to their springiness, therefore, they can slide at the point C' easier than they can at the point B'. Accordingly, the coils 56 hold and pivot at the point B' and slide to the right at the point C', as viewed in the orientation of Figure 7. The slight amount the coils slide at the point C' is subtracted from the amount the coils 56 will move back at the point A'. Accordingly, an incremental movement occurs which facilitates rotation of the valve since the valve cap 10 is locked to the valve stem 37 by the locking means 42.

As previously described, since the collar 11 is assembled with the valve cap 10 in such a manner as to preload the spring means 28, the spring means 28 operates to restrict any turning movement of the valve cap 10 and the collar 11 when the valve is in the first stages of being opened and is being subjected to minimum load. This is highly desirable since a turning motion at either the early valve-opening or just at the valve-closing stage of the cycle tends to wear the components of the valve assembly too rapidly. Accordingly, by having the parts assembled in preloaded condition, the valve spring 39 will have to be compressed slightly or the axial load between the parts will have to be increased a sufficient amount greater than minimum load, for example, as the valve head 36 is just lifted from its seat 33, so that further tipping over of the coils 56 will occur to turn the valve. Moreover, during the valve-closing operation, the coils 56 will have straightened up and the valve cap 10 will be in contact with the crimped-over portion 29 of the collar 11 before the axial load has again been reduced to a minimum value, or, in other words, before the valve spring 39 has completely expanded and the valve head 36 seated against the seating surface 33. This prevents any turning motion of the valve as it is seated.

Figure 10:
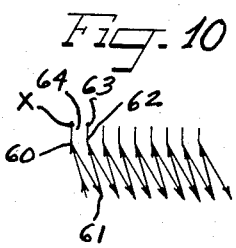
Figure 10 is a developed diagrammatic view illustrating the travel of a point on the edge of one of the axially adjacent parts during the cyclic actuation thereof.

Referring to Figure 10, this developed diagrammatic view illustrates how a point X on the edge of the valve cap 10 moves as the valve is opened and closed. First the point X moves generally vertically downwardly to approximately the point 60 whereupon the point X is translated at an angle as indicated at 61. As the valve closes, the point X will go upwardly at an angle to a vertical line less than the angle on the downstroke, as indicated between 61 and 62. Then the point goes straight up to 63 having gained an incremental amount indicated in Figure 10 by the reference numeral 64.

Figure 9:
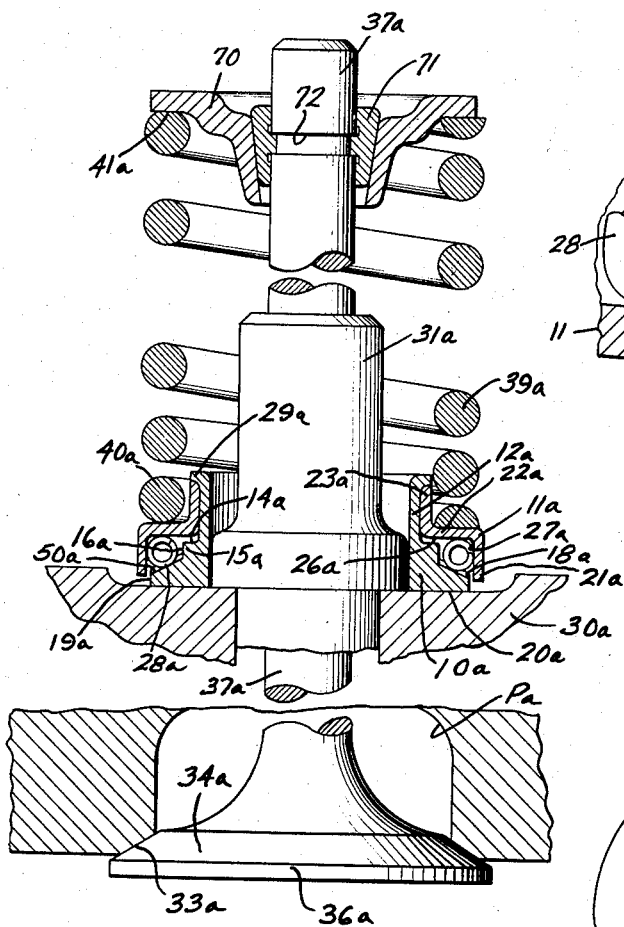
Figure 9 is a view similar to Figures 1 and 11 but showing an alternative embodiment wherein the valve-rotating device of the present invention is installed between the valve spring and the engine part.

All of the structural and operational features of the invention as already described are incorporated in the embodiment of Figure 9, the only difference being that the valve-rotating device of the embodiment of Figure 9 is adapted to be interposed between the valve spring and the engine part, rather than between the valve cap and the spring collar. Thus, wherever possible, similar reference numerals have been applied to similar parts but bearing the suffix a. An inner part 10a has a cylindrical body portion 12a and an annular shoulder 15a providing a radially extending surface 14a and an axially extending surface 16a. The outside peripheral edge of the inner member 10a is indicated at 19a and an end wall or bearing surface 18a is formed in a conical shape tapering inwardly from the outer edge 19a at an angle of approximately 25°. An end surface 20a is seated directly against an engine part 30a concentrically with respect to the valve axis, the valve head being indicated at 36a and controlling a port Pa having a beveled valve seat 33a seating a correspondingly beveled surface 34a formed on the valve head 36a. A valve stem 37a reciprocates in a valve guide 31a and is normally biased towards a valve-closed position by a valve spring 39a bottomed at one end indicated at 40a against an outer member 11a. The outer member 11a has a concave side wall 21a, a radially extending wall 22a providing a flat inner surface 26a and an axially extending wall portion 23a. Note that the inner and outer members 10a and 11a are retained in preloaded assembly by virtue of an offset flange indicated at 29a formed, in this embodiment of the invention, on the inner member 10a rather than on the outer member and overlying the wall portion 23a of the outer member.

The inner member is provided with grooves 50a, as in the other form of the invention, spacing the coils 56a of a spring means 28a between the inner surface 26a, a concave inner surface 27a formed by the side wall 21a and the tapered surface 18a.

At the end of the stem 37a, the usual valve cap 70 is retained at the end of the valve stem 37a by means of the usual fastening means 71 cooperating with a groove 72. The end of the coil spring 39a indicated at 41a is bottomed against the valve cap 70. The operation of the valve-rotating device of Figure 9 is similar to that already described in connection with the other form of the invention.

It will be apparent from the foregoing, that the three point bearing arrangement between the surfaces of the valve-rotating device and the peripheral surface of the coils 56 provides a means for automatically taking up wear of the spring means 28 and the parts 10 and 11 immediately contacting the spring means. Moreover, the three point bearing of the spring coils or coiled loops against the valve cap 10 and the two points on the retaining collar 11 make possible the use of wide limits on the diameter of the coils 56 in the spring means 28, thereby materially reducing the cost of the spring.

Although various minor structural modifications might be suggested by those versed in the art, it should be understood that I wish to embody within the scope of the patent warranted hereon all such modifications as reasonably and properly come within the scope of my contribution to the art.

I claim as my invention:

1. In combination, two axially loaded parts having load-transmitting spring means between said parts and being assembled in preloaded relation to restrict the parts against rotation, said spring means providing a plurality of coils, said parts having axially spaced abutment surfaces engaging each coil to transmit a portion of the load transversely of the spring and between the parts, one of said parts having means forming an axially extending abutment surface engaging the outermost periphery of said coils, whereupon the coils will tip in response to increased axial load, thereby removing the restriction against rotation and rotatably driving the parts with respect to one another.

2. In combination, two relatively rotatable axially adjacent parts, load-transmitting spring means confined between the parts engaging and restricting said parts against rotation while carrying normal axial loads, said spring means including a plurality of circumferentially spaced helically looped coils, said parts providing two axially spaced abutment surfaces as well as an axially extending confining surface engaging each coil at spaced points on the periphery thereof to tip the coils in a circumferentially extending direction, thereby removing the restriction against rotation and angularly displacing one part with respect to the other part.

3. The method of rotating two axially adjacent relatively rotatable parts which includes the steps of preloading the parts to restrict rotation therebetween at minimum load by axially compressing the transversely aligned coils of a helically coiled spring means between the adjoining parts, cyclically subjecting the parts to increased axial load, and tipping the coils in a circumferentially extending direction in response to greater than minimum load to remove the restriction against rotation on the parts and to rotatably drive the parts with respect to one another.

4. The use of a spring means having a plurality of helically wound coils as a rotating device which includes the steps of preloading the coils by confining the coils transversely of the coiling axis and between confronting spaced surfaces of axially adjacent relatively rotatable parts, thereby to restrict the parts against rotation below a predetermined minimum load, cyclically loading and unloading the parts with a load of a value above said predetermined minimum load and tipping the coils in a circumferentially extending direction to remove the restriction against rotation and to rotatably drive the parts with respect to one another.

5. In a valve-rotating device, the improvement of a spring means having a plurality of coils squeezed between and against adjoining surfaces of relatively rotating valve and engine parts, deformed from their free state contour by a predetermined preloading force to restrict the parts against relative rotation at minimum load and deforming in response to valve-opening load to free the parts for rotation and thereupon tip to effect rotation of the parts.

6. A valve-rotating device comprising a valve spring, a valve stem, and means interconnecting said valve stem and said valve spring including a coil providing spring means transmitting load transversely of the coil axis of the spring means and having transversely opposed sides thereof circumferentially translated to rotatably drive the valve stem in response to increased valve load, and further including relatively rotatable abutment surfaces preloaded against the coils to restrict the valve stem against rotation at minimum load.

7. For use in rotating the valve stem of a poppet valve, a valve cap on the end of said stem, spring means comprising a plurality of helically wound coils engaged at one side against said valve cap with the spring coil axis concentric to said stem, a valve spring retainer engaged against the opposite side of the spring coils, and fastening means retaining said valve cap and said spring retainer in assembly with said coils preloaded in amount sufficient to restrict the valve against rotation at minimum load.

8. In combination, two axially adjacent relatively rotatable parts, spring means providing a plurality of helically wound coils, one of said parts having a concave inner surface and a flat inner surface providing angularly offset two point bearing engagement for said coils, and means compelling said coils to bear with greater force against said flat inner surface than against said concave inner surface, thereby transmitting minimum load through said coils transversely of the coiling axis and tipping said coils in response to greater than minimum load to rotatably drive the parts.

9. In combination, two axially adjacent relatively rotatable parts, and spring means between the parts providing a plurality of helically wound coils, one of said parts having a plurality of concentrically spaced grooves receiving and maintaining said coils in spaced relationship to prevent bunching up and to retain said coils in operative valve-rotating position.

10. In combination, two axially adjacent relatively rotatable parts, and spring means providing a plurality of helically wound coils, one of said parts having a flat inner surface overlying said coils on one side of said spring means and a concave inner surface surrounding said coils concentrically outwardly thereof, the other of said parts having a conically-shaped surface generally overlying said coils on the other side of said spring means, and means to load said parts axially, said surfaces being concentrically disposed relative to the axis of the parts and effecting three point contact with each respective coil to transmit minimum load between the parts through said spring means transversely of the coiling axis of said coils, said coils tipping in response to increased axial load to rotatably drive the parts.

11. In combination, two axially adjacent relatively rotatable parts, and spring means providing a plurality of helically wound coils, one of said parts having a flat inner surface overlying said coils on one side of said spring means and a concave inner surface encircling said coils concentrically outwardly thereof, the other of said parts having a surface generally overlying said coils on the other side of said spring means and tapering concentrically inwardly from said concave inner surface at an angle in the order of 20° to 30°, the inner peripheral edge of said tapered surface having an annular shoulder formed thereon in register with but spaced from said flat inner surface to form a limit stop together therewith for preventing overstressing of said spring means, and means to load said parts axially, said surfaces being concentrically disposed relative to the axis of the parts and effecting three point contact with each respective coil to transmit minimum load between the parts through said spring means transversely of the coiling axis of the coils, said coils tipping in response to increased load to rotatably drive the parts.

12. In combination, two axially adjacent relatively rotatable parts, and spring means providing a plurality of helically wound coils, one of said parts having a flat inner surface overlying said coils on one side of said spring means and a concave inner surface encircling said coils concentrically outwardly thereof, the other of said parts having a surface generally overlying said coils on the other side of said spring means and tapering concentrically inwardly from said concave inner surface at an angle in the order of 20 to 30°, said tapered surface being particularly characterized by the formation therein of a plurality of concentrically spaced grooves corresponding in number with the coils of said spring means to keep the coils properly separated and spaced.

13. In combination, two axially adjacent relatively rotatable parts, and spring means providing a plurality of helically wound coils, one of said parts having a flat inner surface overlying said coils on one side of said spring means and a concave inner surface encircling said coils concentrically outwardly thereof, the other of said parts having a surface generally overlying said coils on the other side of said spring means and tapering concentrically inwardly from said concave inner surface at an angle in the order of 20 to 30°, said tapered surface being particularly characterized by the formation therein of a plurality of concentrically spaced grooves corresponding in number with the coils of said spring means to keep the coils properly separated and spaced, said grooves having flat bottoms and tapered sides and being of sufficient width to allow free action of the coils.

14. In combination, axially adjacent relatively rotatable parts, and spring means providing a plurality of helically wound tiltable coils, said parts having axially spaced surfaces transmitting axial load between the parts through said spring means transversely of the coiling axis of the coils, one of said parts having a concave wall concentrically outwardly of said coils and being gripped by said coils in the order of an overrunning clutch during the tilting action of the coils, thereby allowing the spring means and the other part to effect incremental unidirectional angular movements with respect to said one part in response to changing axial loads.

15. In combination, axially adjacent relatively rotatable parts, and spring means providing a plurality of helically wound tiltable coils, said parts having axially spaced surfaces transmitting axial load between the parts through said spring means transversely of the coiling axis of the coils, one of said parts having a concave wall concentrically outwardly of said coils alternately gripping and slipping with relationship to said coils during the tilting action of the coils to effect incremental unidirectional angular movement with respect to the other part in response to changing axial loads, and axial stop means between said parts limiting the tilting of said coils.

16. In combination, axially adjacent relatively rotatable parts, and spring means providing a plurality of helically wound tiltable coils, said parts having axially spaced surfaces transmitting axial load between the parts through said spring means transversely of the coiling axis of the coils, one of said parts having a concave wall concentrically outwardly of said coils alternately gripping and slipping with relationship to said coils during the tilting action of the coils to effect incremental unidirectional angular movement with respect to the other part in response to changing axial loads, and axial stop means between said parts limiting the tilting of said coils, and means to limit the amount the coils can recover after tilting thereof.

17. In combintion, axially adjacent relatively rotatable parts, and spring means providing a plurality of helically wound tiltable coils, said parts having axially spaced surfaces transmitting axial load between the parts through said spring means transversely of the coiling axis of the coils, one of said parts having a concave wall concentrically outwardly of said coils alternately gripping and slipping with relationship to said coils during the tilting action of the coils to effect incremental unidirectional angular movement with respect to the other part in response to changing axial loads, and axial stop means between said parts limiting the tilting of said coils, and means spacing the coils circumferentially with respect to one another to prevent bunching up during the cyclic actuation thereof.

18. In combination, inner and outer coaxially disposed members relatively rotatable and movable longitudinally with respect to one another, said members having an outer concave side wall, a flat end wall extending radially inwardly and offset at right angles to said side wall, and a tapered end wall extending radially inwardly from said side wall and disposed in an inclined plane intersecting said side wall and said flat end wall, said walls forming together with one another an annular recess means concentric to the axis of said members, and spring means in said annular recess means providing a plurality of helically coiled loops disposed transversely between said end walls and engaging against the inner surface of said side wall, retainer means between said inner and outer members retaining said members in preloaded assembly with said coiled loops under a limited load of an amount sufficient to effect transfer of minimum axial loads between the parts through said spring means without appreciable deformation or tipping of said coiled loops and without rotation between the parts, said coiled loops responding to increased axial load tending to further compress said spring means between said parts by tipping in a circumferentially extending direction in said recess means, thereby to rotatably drive said parts.

19. In the combination of claim 18, said parts having formed therebetween an axial stop limiting the compression of said spring means and the tipping of said coiled loops.

20. In the combination of claim 18, said parts having formed therebetween an axial stop limiting the compression of said spring means and the tipping of said coiled loops, said tapered end wall having a plurality of circumferentially spaced grooves formed therein corresponding in number to said coiled loops for spacing the coiled loops and preventing bunching up of the spring means.

21. In a valve-rotating device, an engine part, a valve part reciprocably and rotatably carried by said engine part and load-transmitting means interconnecting said valve part and said engine part including two relatively rotatable axially adjacent inner and outer parts, a valve spring bottomed against one of said inner and outer parts, the other of said inner and outer parts being connected with one of said engine and valve parts, and spring means confined between said inner and outer parts, said inner and outer parts having connecting means retaining said inner and outer parts in preloaded assembly by axially compressing the transversely aligned coils of said spring means to restrict rotation between the parts at minimum load, said coils tipping in a circumferentially extending direction in response to greater than minimum load to remove the restriction against rotation on the inner and outer parts and to rotatably drive said valve part with respect to said engine part.

22. In a valve-rotating device as defined in claim 21, said valve part including a stemmed valve, said inner and outer parts being located at the end of the stemmed portion of said valve part, said inner part being connected in firm assembly with said stemmed portion, said valve spring being bottomed at one end against said outer part and being bottomed at the other end against said engine part.

23. In a valve-rotating device as defined in claim 21, said inner part being seated against said engine part, said valve part including a stemmed valve having a spring cap assembled at the end thereof, said coil spring being bottomed at one end against said outer part and being bottomed at the other end against the spring cap on said stemmed valve part.

24. A valve-rotating device comprising two axially adjacent relatively rotatable parts comprising a valve part and an engine part, said valve part including a stem formed with a locking groove near the end thereof, a valve cap member, retainer means locking said valve cap member to said stem at said locking groove, a collar member concentrically outwardly of said valve cap, said collar having a concave inner surface and a flat radially inwardly extending flange providing a flat inner surface and a valve spring seating surface on opposite sides thereof, spring means interposed between said collar member and said valve cap comprising a plurality of helically wound coils engaged against said concave inner surface and against said flat inner surface of said collar member, said valve cap having a tapered surface overlying said spring means and inclined at an angle of approximately 25°, said valve cap and said collar having connecting means formed therebetween retaining said tapered surface, said concave surface and said inner surface preloaded against said spring coils, thereby to restrict said valve cap and said collar against rotation at minimum load, said spring coils tipping in response to increased load greater than minimum load whereupon said coils will alternately slip and grip said concave surface during the cyclic operation of said valve to effect incremental angular movements of said valve cap with respect to said collar for rotatably driving said valve.

References Cited in the file of this patent

UNITED STATES PATENTS

| | | |
|---|---|---|
| 2,758,583 | Norton | Aug. 14, 1956 |
| 2,761,434 | Norton | Sept. 4, 1956 |
| 2,767,696 | Engemann | Oct. 23, 1956 |